(12) United States Patent
Greenfield et al.

(10) Patent No.: US 9,727,059 B2
(45) Date of Patent: Aug. 8, 2017

(54) INDEPENDENT SPEED AND ATTITUDE CONTROL FOR A ROTARY WING AIRCRAFT

(71) Applicant: Sikorsky Aircraft Corporation, Stratford, CT (US)

(72) Inventors: Aaron L. Greenfield, Shelton, CT (US); John Knag, New Boston, NH (US); Stephen Kubik, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 277 days.

(21) Appl. No.: 14/741,793

(22) Filed: Jun. 17, 2015

(65) Prior Publication Data

US 2015/0367937 A1   Dec. 24, 2015

Related U.S. Application Data

(60) Provisional application No. 62/015,598, filed on Jun. 23, 2014.

(51) Int. Cl.
*G05D 1/08* (2006.01)
*B64C 27/10* (2006.01)
*B64C 27/82* (2006.01)

(52) U.S. Cl.
CPC ......... *G05D 1/0808* (2013.01); *B64C 27/10* (2013.01); *G05D 1/0858* (2013.01);
(Continued)

(58) Field of Classification Search
CPC ......... G05D 1/08–1/0858; B64C 27/22; B64C 27/28
See application file for complete search history.

(56) References Cited

U.S. PATENT DOCUMENTS 6,592,071 B2    7/2003  Kinkead et al.
7,083,142 B2 *  8/2006  Scott ................. B64C 27/10
                                                    244/17.13
(Continued)

OTHER PUBLICATIONS

European Search Report for Application No. 15 17 3048 Issued Dec. 16, 2015; Received Jan. 8, 2016; 7 pages.

*Primary Examiner* — Genna Mott
(74) *Attorney, Agent, or Firm* — Cantor Colburn LLP (57) ABSTRACT

One aspect is a flight control system for independent speed and attitude control of a rotary wing aircraft that includes a main rotor system and a translational thrust system. The flight control system includes a flight control computer configured to interface with the main rotor system and the translational thrust system. The flight control computer includes processing circuitry configured to execute control logic. A pitch attitude reference generator provides a pitch attitude reference to a main rotor controller to command the main rotor system based on pilot input. A longitudinal reference generator produces a longitudinal reference as a longitudinal position or longitudinal velocity based on pilot input. An attitude-to-propulsor crossfeed converts the pitch attitude reference into a propulsor trim adjustment. A propeller pitch controller combines the longitudinal reference and the propulsor trim adjustment into a propeller command, and provides the propeller command to the translational thrust system.

15 Claims, 5 Drawing Sheets

(52) U.S. Cl.
CPC ............... *B64C 2027/8236* (2013.01); *B64C 2027/8272* (2013.01); *B64C 2027/8281* (2013.01)

(56) References Cited

U.S. PATENT DOCUMENTS

| | | |
|---|---|---|
| 7,857,254 B2 | 12/2010 | Parks |
| 2008/0237392 A1 | 10/2008 | Piasecki et al. |
| 2008/0249672 A1 | 10/2008 | Cherepinsky |
| 2010/0310371 A1 | 12/2010 | Eglin |
| 2013/0138270 A1 | 5/2013 | Christensen et al. |
| 2013/0175385 A1 | 7/2013 | Eglin |

\* cited by examiner

INDEPENDENT SPEED AND ATTITUDE CONTROL FOR A ROTARY WING AIRCRAFT

CROSS-REFERENCE TO RELATED APPLICATIONS

This application claims the benefit of U.S. provisional patent application Ser. No. 62/015,598 filed Jun. 23, 2014, the entire contents of which are incorporated herein by reference.

BACKGROUND OF THE INVENTION

Embodiments of the invention generally relate to a control system of a rotary wing aircraft, and more particularly, to a system for independent speed and attitude control for a rotary wing aircraft.

A conventional helicopter controls aircraft speed with rotor tilt via attitude change. Hover attitude is fixed for a conventional helicopter and may not be optimal for visibility or air/ground transitions, such as slope landings. Maneuvering to change aircraft speed requires an attitude change that can also impact visibility and ride comfort in a conventional helicopter.

A hybrid helicopter, such as a rotary wing aircraft with a coaxial contra-rotating rotor system and a translational thrust system, can control aircraft speed and attitude independently. A translational thrust system can include an integrated propulsor unit with a propulsor (e.g., a propeller) oriented substantially horizontal and parallel to the aircraft longitudinal axis to provide supplemental thrust. Using the translational thrust system, aircraft speed can be held at a range of attitudes. This can allow a hybrid helicopter to hover at a variety of attitudes, maneuver at low speeds at a variety of attitudes, as well as transition to forward flight at a fixed pitch attitude. The ability to maintain pitch attitude or vary attitude independent of aircraft speed during changes in aircraft speed can provide additional time on target for military applications, and increased ride comfort for medevac and civil applications. This capability can also reduce hub loads during slope landings. Manual control of propulsor pitch in the translational thrust system can be provided using a beeper, which allows for control of an additional degree of freedom but significantly increases pilot workload. Manually coordinating aircraft attitude, position (i.e., hover position), speed, and/or altitude can be particularly challenging for a pilot when performing precision maneuvers.

Therefore, a need exists for an improved automatic control approach to independent speed and attitude control for a rotary wing aircraft.

BRIEF DESCRIPTION OF THE INVENTION

According to one embodiment, a flight control system provides independent speed and attitude control for a rotary wing aircraft that includes a main rotor system and a translational thrust system. The flight control system includes a flight control computer configured to interface with the main rotor system and the translational thrust system. The flight control computer includes processing circuitry configured to execute control logic that includes: a pitch attitude reference generator, a longitudinal reference generator, an attitude-to-propulsor crossfeed, a main rotor controller, and a propeller pitch controller. The pitch attitude reference generator is configured to provide a pitch attitude reference to the main rotor controller to command the main rotor system based on pilot input. The longitudinal reference generator is configured to produce a longitudinal reference as a longitudinal position or longitudinal velocity for the propeller pitch controller based on pilot input. The attitude-to-propulsor crossfeed is configured to convert the pitch attitude reference into a propulsor trim adjustment. The propeller pitch controller is configured to combine the longitudinal reference and the propulsor trim adjustment into a propeller command, and provide the propeller command to the translational thrust system.

In addition to one or more of the features described above or below, or as an alternative, further embodiments could include reference prioritization logic configured to prioritize setting one of the pitch attitude reference or the longitudinal reference in order to accommodate a limited control envelope.

In addition to one or more of the features described above or below, or as an alternative, further embodiments could include where the flight control computer is configurable to disable the attitude-to-propulsor crossfeed and revert to a pitch attitude-based speed control mode.

In addition to one or more of the features described above or below, or as an alternative, further embodiments could include an altitude reference generator configured to produce an altitude based pitch reference for the pitch attitude reference generator.

In addition to one or more of the features described above or below, or as an alternative, further embodiments could include where the flight control computer is further configured to interface with a plurality of sensors and provide feedback signals to the main rotor controller and the translational thrust system based on the sensors.

In addition to one or more of the features described above or below, or as an alternative, further embodiments could include where the attitude-to-propulsor crossfeed maps aircraft pitch angles to propeller pitch angles.

In addition to one or more of the features described above or below, or as an alternative, further embodiments could include where the main rotor system includes dual contra-rotating main rotors.

In addition to one or more of the features described above or below, or as an alternative, further embodiments could include where the translational thrust system includes an auxiliary propulsor configured as a pusher propeller.

A further embodiment includes a method of providing independent speed and attitude control on a rotary wing aircraft that includes a main rotor system and a translational thrust system. A pitch attitude reference for a main rotor controller to command the main rotor system is generated based on pilot input. A longitudinal reference is produced as a longitudinal position or longitudinal velocity based on pilot input. The pitch attitude reference is converted into a propulsor trim adjustment. The longitudinal reference and the propulsor trim adjustment are combined into a propeller command The propeller command is provided to the translational thrust system.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments provide a flight control configured to coordinate translational thrust system control with attitude changes of a rotary wing aircraft. Embodiments enable holding of a position (i.e., hover position), and aircraft speed independent of aircraft pitch attitude based on pilot inputs. The rotary wing aircraft may include a coaxial configuration and a translational thrust system providing two mechanisms for manipulating speed including: an attitude change resulting in forward thrust, or a propulsor change of the translational thrust system resulting in forward thrust. The flight control automates control of both aircraft speed and attitude degrees of freedom on the aircraft independently for tasks such as position hold and speed hold to reduce pilot workload. Exemplary embodiments enable a pilot to specify a desired attitude reference and a desired speed or position reference, and apply a combination of feed forward and feedback control to maintain the specified references. The flight control can also support altitude hold to maintain a pilot specified altitude reference as well. Without automatic control, the pilot would be required to simultaneously coordinate collective, main rotor cyclic, and propeller control inputs to achieve desired aircraft behavior, which can be difficult, especially for dynamic changes in conditions.

Figure 1:
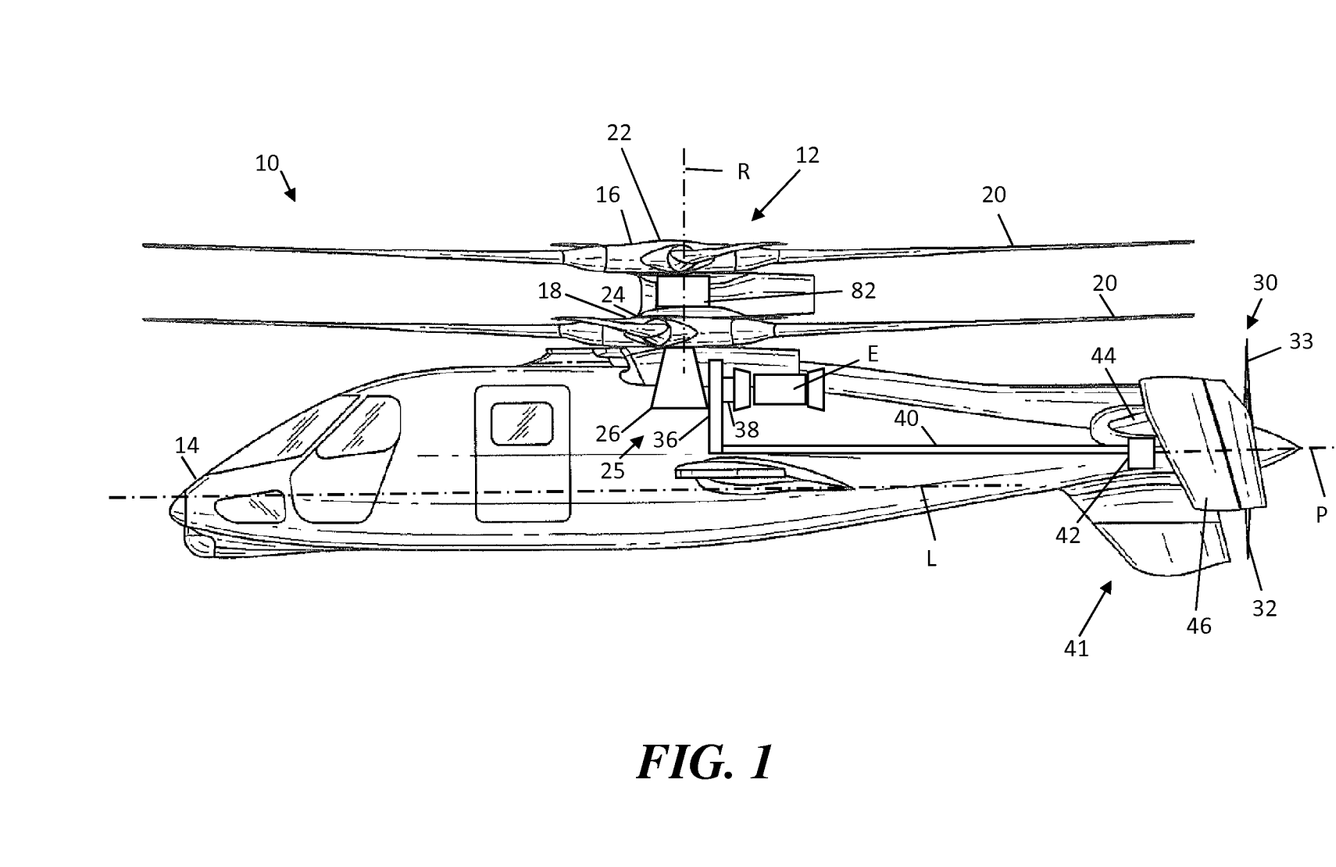
FIG. 1 is a general side view of an exemplary rotary wing aircraft for use in accordance with embodiments.
Figure 2:
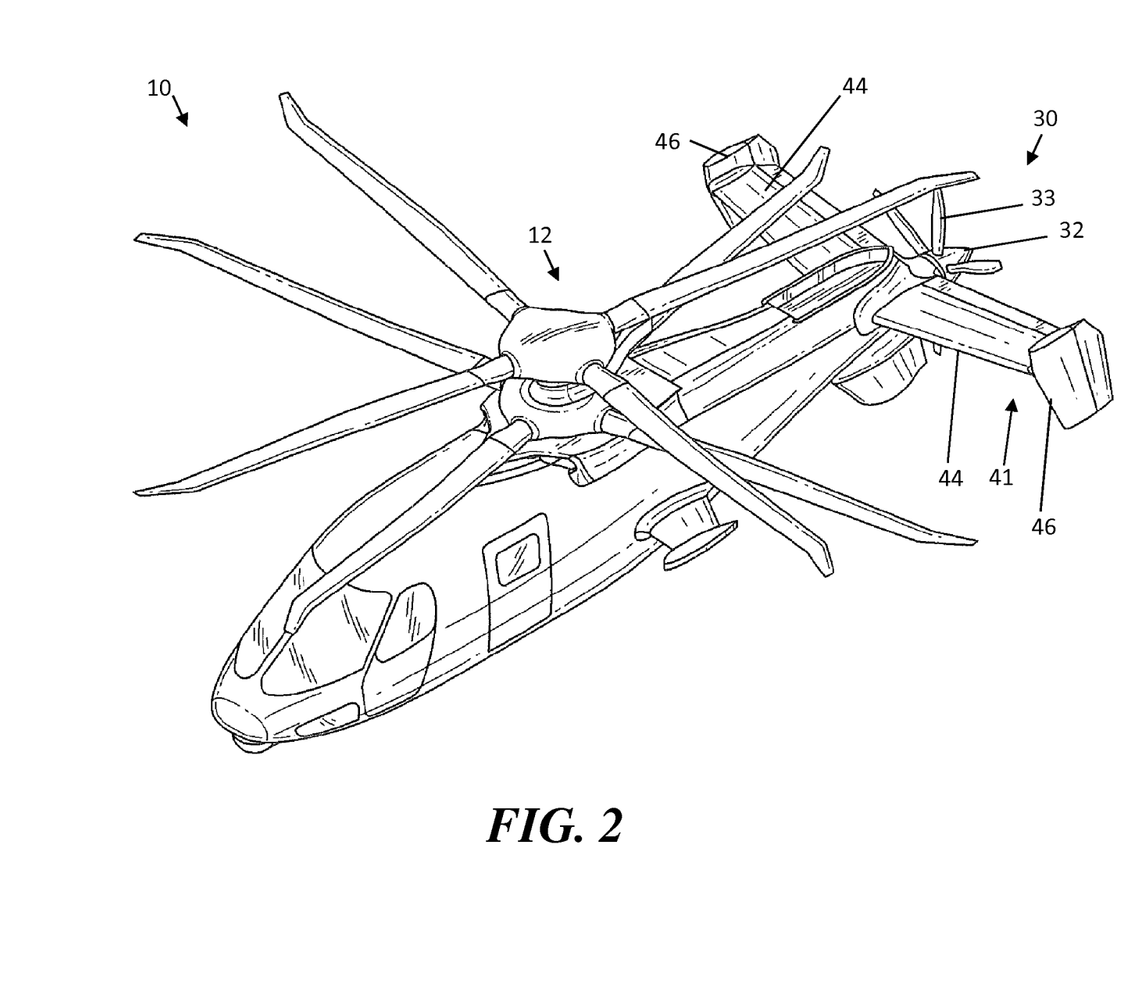
FIG. 2 is a perspective view of the exemplary rotary wing aircraft of FIG. 1.

FIGS. 1 and 2 illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively. A swashplate assembly 82 can enable control of the rotor blade assemblies 20 for pitch attitude control, as well as roll and collective control. The main rotor system 12 is driven by a transmission 25. The translational thrust system 30 may be any propeller system including, but not limited to a pusher propeller, a tractor propeller, a nacelle mounted propeller, etc. In the example of FIGS. 1-2, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed flight. The translational thrust system 30 may be driven through a main gearbox 26 which also drives the main rotor system 12.

The transmission 25 includes the main gearbox 26 driven by one or more engines, illustrated schematically at E. The main gearbox 26 and engines E are considered as part of the non-rotating frame of the aircraft 10. In the case of a rotary wing aircraft, the main gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

The transmission 25 may also include a combiner gearbox 36 in meshing engagement with the main gearbox 26 and driven by one or more engines E. The engines E may drive the combiner gearbox 36 and the main gearbox 26 through a disconnecting mechanism, such as an overrunning clutch 38. The translational thrust system 30 can include a drive shaft 40 which is driven by the combiner gearbox 36 to drive the auxiliary propulsor 32 through an auxiliary propulsor gearbox 42. It should be understood that although the combiner gearbox 36 is schematically illustrated as a separate component, the combiner gearbox 36 may alternatively be incorporated directly into the main gearbox 26.

In the example of FIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. During flight regimes, aircraft pitch attitude and longitudinal velocity demands (i.e., speed) can change independently. Exemplary embodiments control both the main rotor system 12 and the translational thrust system 30 to support a range of aircraft pitch attitudes over a range of aircraft airspeeds.

Figure 3:
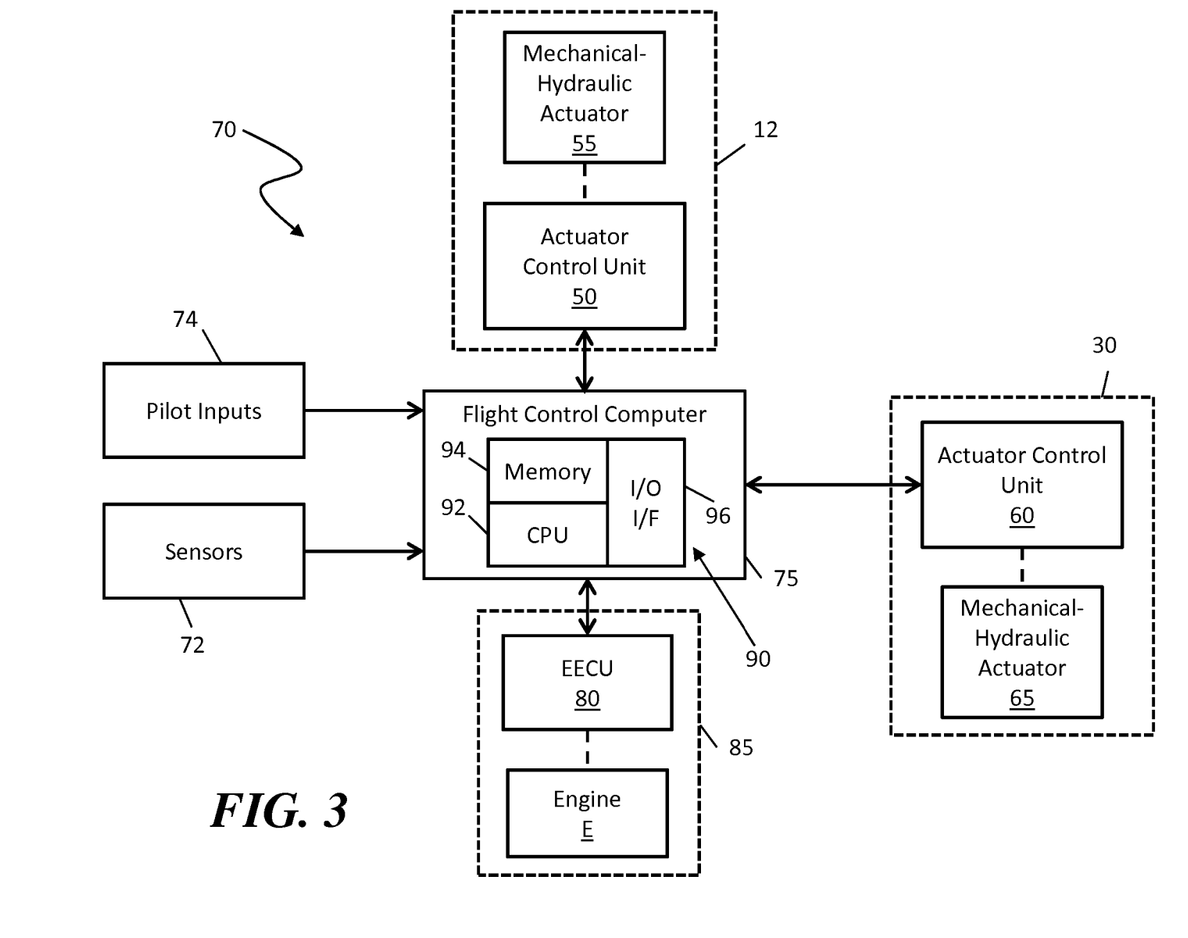
FIG. 3 is a schematic diagram of a flight control system of a rotary wing aircraft according to an embodiment.

Portions of the aircraft 10, such as the main rotor system 12 and the translational thrust system 30 for example, are driven by a flight control system 70 illustrated in FIG. 3. In one embodiment, the flight control system 70 is a fly-by-wire (FBW) control system. In a FBW control system, there is no direct mechanical coupling between a pilot's controls and movable components such as rotor blade assemblies 20 or propeller blades 33 of the aircraft 10 of FIGS. 1 and 2. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands In response to inputs from the sensors 72 and pilot inputs 74, the FCC 75 transmits signals to various subsystems of the aircraft 10, such as the main rotor system 12 and the translational thrust system 30. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust the swashplate assembly 82 of FIG. 1 to control the rotor blade assemblies 20 of FIGS. 1 and 2. Alternatively, the FCC 75 can directly control the one or more actuators 55, and the actuator control unit 50 can be omitted.

The translational thrust system 30 can include an actuator control unit 60 configured to receive commands from the FCC 75 to control one or more actuators 65, such as a mechanical-hydraulic actuator, for the propeller blades 33 of FIGS. 1 and 2. In an embodiment, pilot inputs 74 include a propeller pitch command for the actuator control unit 60 to drive the one or more actuators 65 for controlling the propeller blades 33 of FIGS. 1 and 2. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

Figure 4:
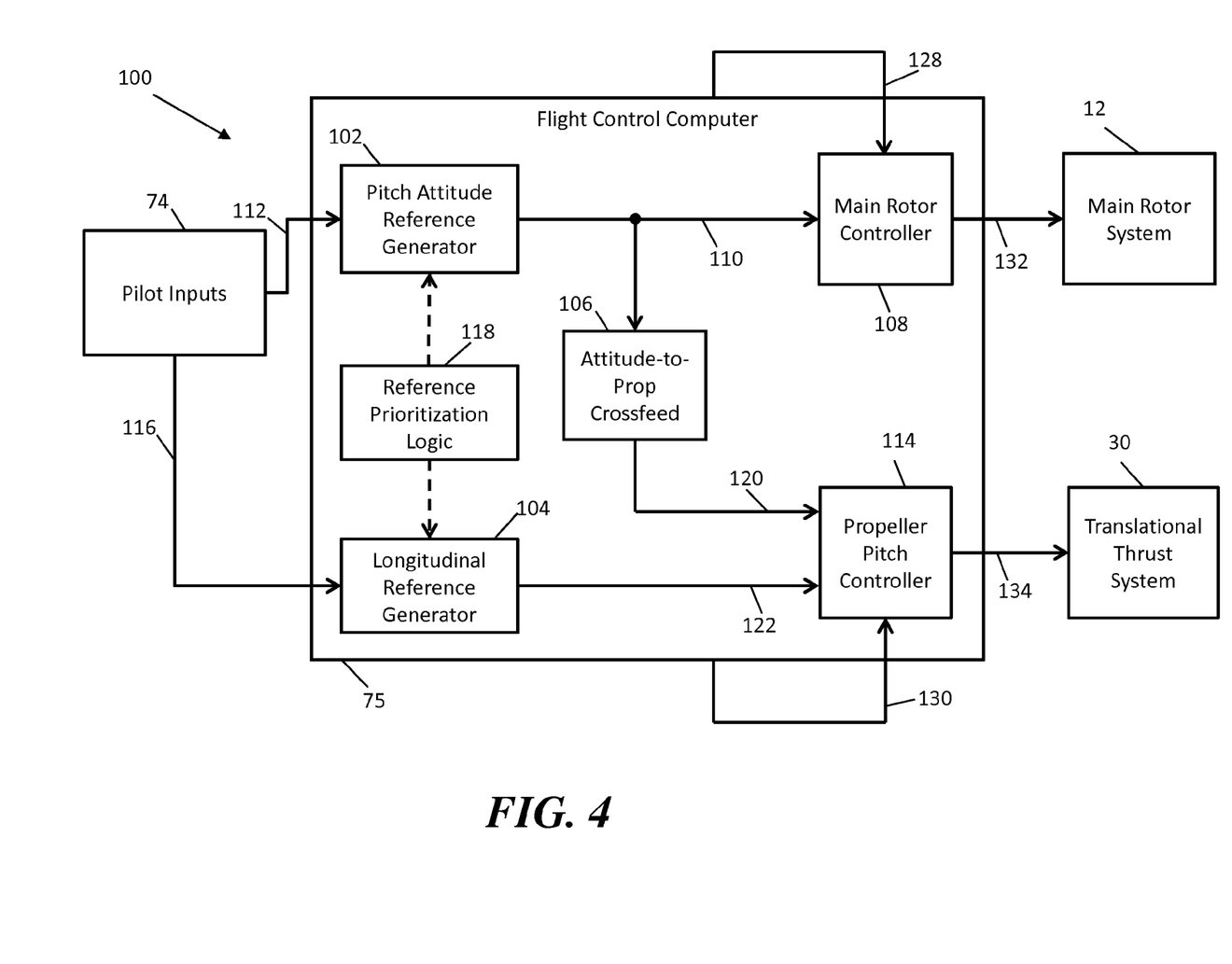
FIG. 4 is a schematic diagram of control logic in a flight control computer of a rotary wing aircraft according to an embodiment.

FIG. 4 depicts a portion of control logic 100 in the FCC 75. The control logic 100 may be embodied as executable instructions in the memory 94 of FIG. 3, where the processing circuitry 92 of FIG. 3 is configured to read and execute the control logic 100. The control logic 100 can include a pitch attitude reference generator 102, a longitudinal reference generator 104, an attitude-to-propulsor crossfeed 106, a main rotor controller 108, and a propeller pitch controller 114. The pitch attitude reference generator 102 is configured to provide a pitch attitude reference 110 to the main rotor controller 108 to command the main rotor system 12 based on pilot input 112. The pilot input 112 can be an independently adjustable pitch attitude command from a cyclic inceptor or beeper, for example.

The longitudinal reference generator 104 is configured to produce a longitudinal reference 122 as a longitudinal position or longitudinal velocity based on pilot input 116. The pilot input 116 may be a speed command or a position command. For example, the pilot input 116 can be from an airspeed hold beeper which can incrementally increase or decrease a speed or longitudinal velocity reference. Alternatively, the pilot input 116 can be provided by a hover hold beeper which can incrementally increase or decrease a position reference (i.e., longitudinal and latitudinal position, but not altitude). The longitudinal reference 122 is provided to the propeller pitch controller 114.

The attitude-to-propulsor crossfeed 106 is configured to convert the pitch attitude reference 110 into a propulsor trim adjustment 120. The attitude-to-propulsor crossfeed 106 may map aircraft pitch angles to propeller pitch angles to counteract changes in thrust due to changes in the pitch attitude reference 110 with corresponding propeller pitch angle changes of the propeller blades 33 of FIGS. 1 and 2.

As previously described in reference to FIG. 3, the FCC 75 may interface with a plurality of sensors 72. Signals from the sensors can be processed, e.g., fault checked and converted to engineering units, and provided as feedback signals 128 (e.g., sensed aircraft pitch attitude) to the main rotor controller 108 and as feedback signals 130 (e.g., sensed aircraft longitudinal position and/or velocity) to the propeller pitch controller 114. The main rotor controller 108 may generate main rotor commands 132 to control one or more actuators 55 of FIG. 3 based on a gain adjusted difference between the pitch attitude reference 110 and the feedback signals 128, for instance, as longitudinal control for the swashplate assembly 82 of FIG. 1. The main rotor controller 108 may also include a feed forward action based on changes in the pitch attitude reference 110. The propeller pitch controller 114 may generate a propeller command 134 to control one or more actuators 65 of FIG. 3 based on the longitudinal reference 122, the propulsor trim adjustment 120, and the feedback signals 130, for instance, as pitch control of the propeller blades 33 of FIGS. 1 and 2. The propeller command 134 represents a total propeller pitch command, which can be a summation of the propulsor trim adjustment 120, a command based on a gain adjusted error representing a difference between the longitudinal reference 122 and the feedback signals 130, as well as a feed forward action based on the longitudinal reference 122.

The control logic 100 can also include reference prioritization logic 118. There is a finite envelope over which all degrees of control: attitude, speed, and altitude can be simultaneously achieved, due to a variety of aircraft limits such as control limits. The reference prioritization logic 118 allows for the prioritization of one degree of freedom over another. For example, if attitude is increased beyond a threshold at hover, there is no longer sufficient propeller control authority to balance the main rotor thrust. Thus, position hold with independent attitude hold can be maintained over a finite attitude range, after which, either the position hold function must be relaxed, or disengaged, or the attitude reference must be limited to stay within the controllable envelope. Similarly, for higher speed operations, tradeoffs are made between maintaining speed, altitude, and achieving a given aircraft attitude. Accordingly, the reference prioritization logic 118 can be configured to prioritize setting one of the pitch attitude reference 110 or the longitudinal reference 122 in order to accommodate a limited control envelope.

The FCC 75 may also be configurable to disable the attitude-to-propulsor crossfeed 106 and revert to a pitch attitude-based speed control mode. In a pitch attitude-based speed control mode, a speed reference from the longitudinal reference generator 104 may be provided to the pitch attitude reference generator 102, for example, if the pilot input 112 is unavailable. Disabling the attitude-to-propulsor crossfeed 106 prevents independent attitude control, as the pilot input 112 is replaced by a speed reference from the longitudinal reference generator 104.

Figure 5:
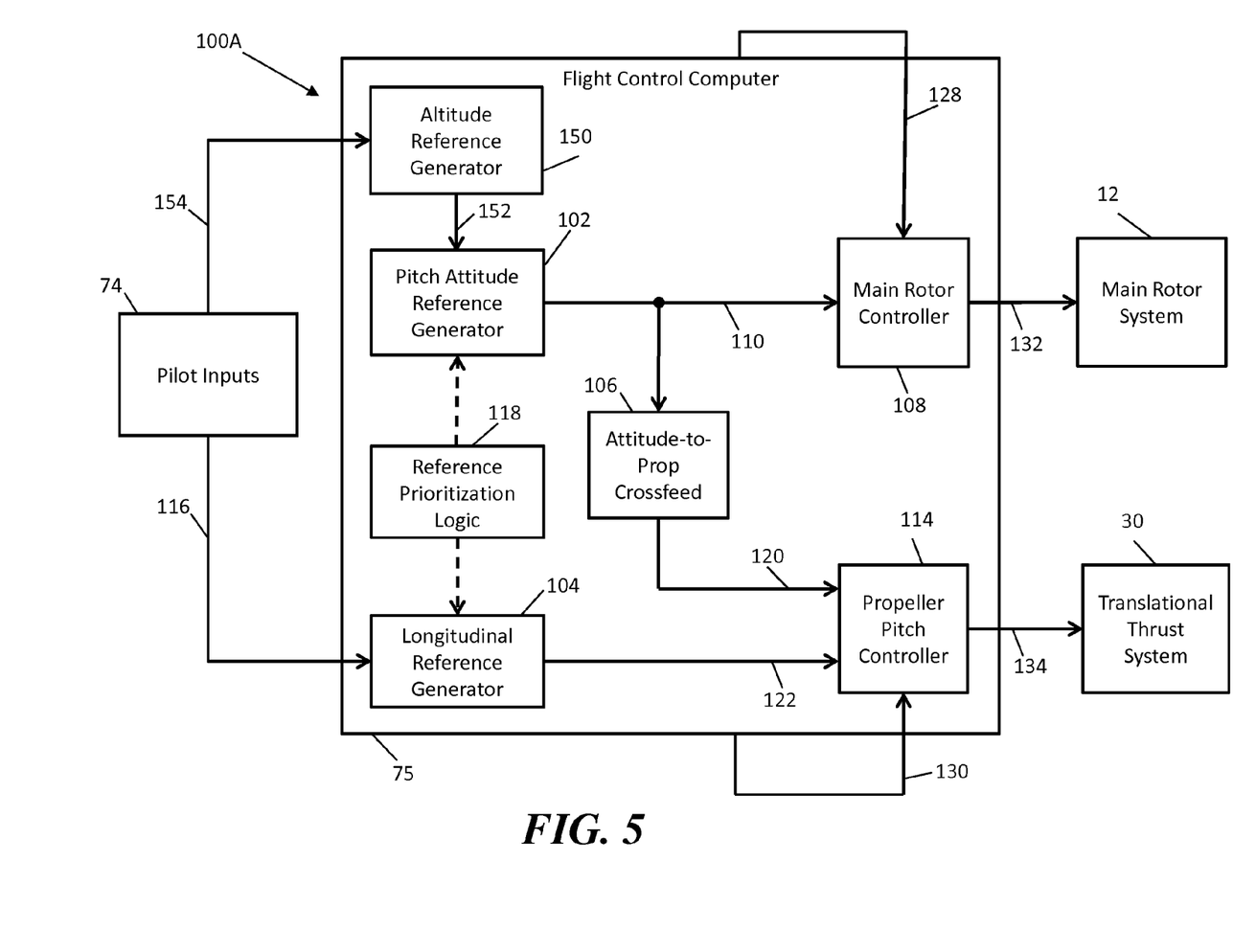
FIG. 5 is a schematic diagram of control logic in a flight control computer of a rotary wing aircraft according to another embodiment.

FIG. 5 is a schematic diagram of control logic 100A in FCC 75 according to another embodiment. Similar to the control logic 100 of FIG. 4, the control logic 100A of FIG. 5 may be embodied as executable instructions in the memory 94 of FIG. 3, where the processing circuitry 92 of FIG. 3 is configured to read and execute the control logic 100A. The control logic 100A can include the pitch attitude reference generator 102, the longitudinal reference generator 104, the attitude-to-propulsor crossfeed 106, the main rotor controller 108, and the propeller pitch controller 114 as described in reference to FIG. 4. The control logic 100A may also include the reference prioritization logic 118 as described in reference to FIG. 4. In addition, the control logic 100A may include an altitude reference generator 150 configured to produce an altitude based pitch reference 152 based on an altitude command 154 from pilot inputs 74. In an embodiment, the altitude based pitch reference 152 replaces pilot input 112 of FIG. 4 as a reference for generating the pitch attitude reference 110 by the pitch attitude reference generator 102. In low-speed forward flight, altitude hold can be used and works with collective inputs.

Exemplary embodiments include a method of providing independent speed and attitude control on a rotary wing aircraft 10 that includes a main rotor system 12 and a translational thrust system 30, as described in reference to FIGS. 1-5. A pitch attitude reference 110 to a main rotor controller 108 to command the main rotor system 12 is generated based on pilot input 112. A longitudinal reference 122 is produced as a longitudinal position or longitudinal velocity based on pilot input 116. The pitch attitude reference 110 is converted into a propulsor trim adjustment 120. Converting the pitch attitude reference 110 into a propulsor trim adjustment 120 can include mapping aircraft pitch angles to propeller pitch angles. The longitudinal reference 122 and the propulsor trim adjustment 120 are combined into a propeller command 134. The propeller command 134 is provided to the translational thrust system 30.

As described in reference to FIG. 4, prioritizing setting one of the pitch attitude reference 110 or the longitudinal reference 122 in order to accommodate a limited control envelope can be performed by the reference prioritization logic 118. The FCC 75 may also support disabling the attitude-to-propulsor crossfeed 106 to revert to a pitch attitude-based speed control mode. Also, as previously described in reference to FIG. 5, the FCC 75 can produce an altitude based pitch reference 152 for the pitch attitude reference generator 102 according to an embodiment.

Technical effects include coordination of translational thrust system control with attitude changes of a rotary wing aircraft to hold a position or aircraft speed based on pilot inputs. Technical effects also include coordination of attitude changes with an altitude hold for a main rotor system of a rotary wing aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A flight control system for independent speed and attitude control of a rotary wing aircraft comprising a main rotor system and a translational thrust system, the flight control system comprising:

a flight control computer configured to interface with the main rotor system and the translational thrust system, the flight control computer comprising processing circuitry configured to execute control logic comprising:

a pitch attitude reference generator configured to generate a pitch attitude reference and provide the pitch attitude reference to a main rotor controller in response to a first pilot input to command the main rotor system;

a longitudinal reference generator configured to produce a longitudinal reference as a longitudinal position or longitudinal velocity based on a second pilot input;

an attitude-to-propulsor crossfeed configured to convert the pitch attitude reference into a propulsor trim adjustment; and a propeller pitch controller configured to combine the longitudinal reference and the propulsor trim adjustment into a propeller command, and provide the propeller command to the translational thrust system.

2. The flight control system according to claim 1, further comprising:

reference prioritization logic configured to prioritize one of the pitch attitude reference or the longitudinal reference in order to accommodate a limited control envelope.

3. The flight control system according to any of claims 1-2, wherein the flight control computer is configurable to disable the attitude-to-propulsor crossfeed and revert to a pitch attitude-based speed control mode.

4. The flight control system according to claim 1, further comprising:

an altitude reference generator configured to produce an altitude based pitch reference for the pitch attitude reference generator.

5. The flight control system according to claim 1, wherein the flight control computer is further configured to interface with a plurality of sensors and provide feedback signals to the main rotor controller and the translational thrust system based on the sensors.

6. The flight control system according to claim 1, wherein the attitude-to-propulsor crossfeed maps aircraft pitch angles to propeller pitch angles.

7. The flight control system according to claim 1, wherein the main rotor system further comprises dual contra-rotating main rotors.

8. The flight control system according to claim 1, wherein the translational thrust system comprises an auxiliary propulsor configured as a pusher propeller.

9. A method of providing independent speed and attitude control on a rotary wing aircraft comprising a main rotor system and a translational thrust system, the method comprising:
- generating a pitch attitude reference and providing the pitch attitude reference to a main rotor controller in response to a first pilot input to command the main rotor system;
- producing a longitudinal reference as a longitudinal position or longitudinal velocity based on a second pilot input;
- converting the pitch attitude reference into a propulsor trim adjustment;
- combining the longitudinal reference and the propulsor trim adjustment into a propeller command; and
- providing the propeller command to the translational thrust system.

10. The method according to claim 9, further comprising:
- prioritizing one of the pitch attitude reference or the longitudinal reference in order to accommodate a limited control envelope.

11. The method according to claim 9, further comprising:
- disabling an attitude-to-propulsor crossfeed to revert to pitch attitude-based speed control mode.

12. The method according to claim 9, further comprising:
- producing an altitude based pitch reference for a pitch attitude reference generator.

13. The method according to claim 9, wherein converting the pitch attitude reference into a propulsor trim adjustment further comprises mapping aircraft pitch angles to propeller pitch angles.

14. The method according to claim 9, wherein the main rotor system further comprises dual contra-rotating main rotors.

15. The method according to claim 9, wherein the translational thrust system comprises an auxiliary propulsor configured as a pusher propeller.

* * * * *